(No Model.)
C. H. ROBISON.
APPARATUS FOR RENDERING FATS.
No. 287,862. Patented Nov. 6, 1883.
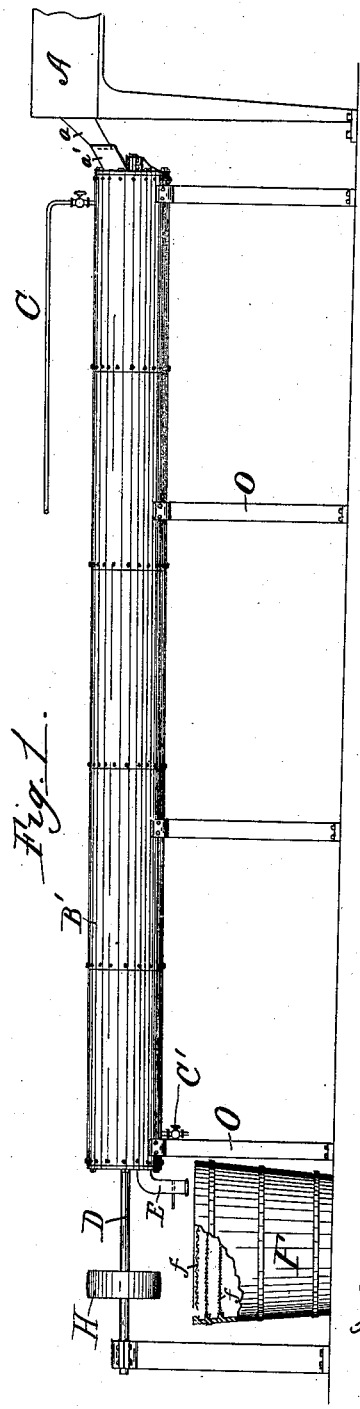
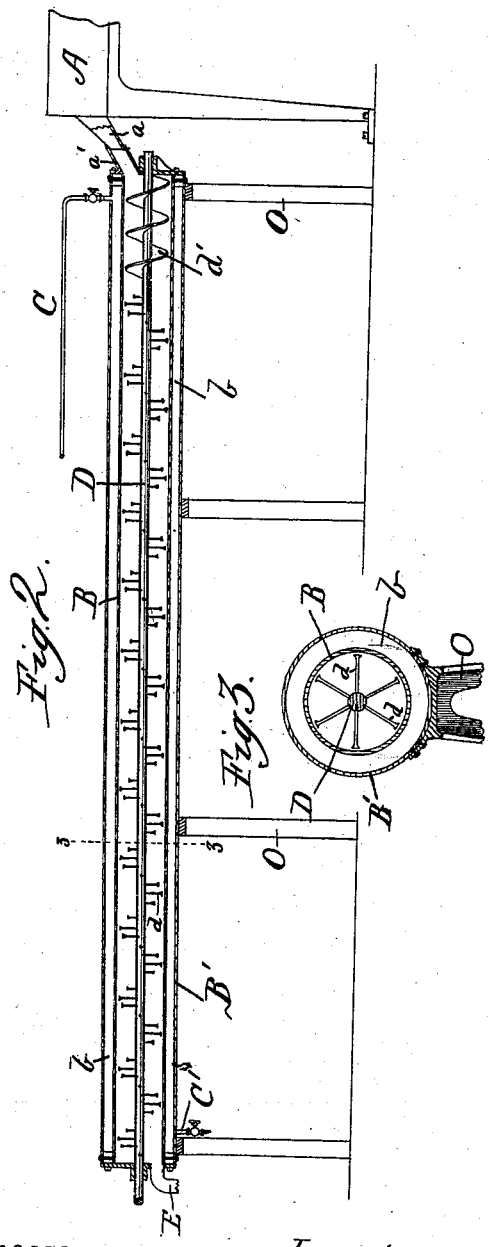
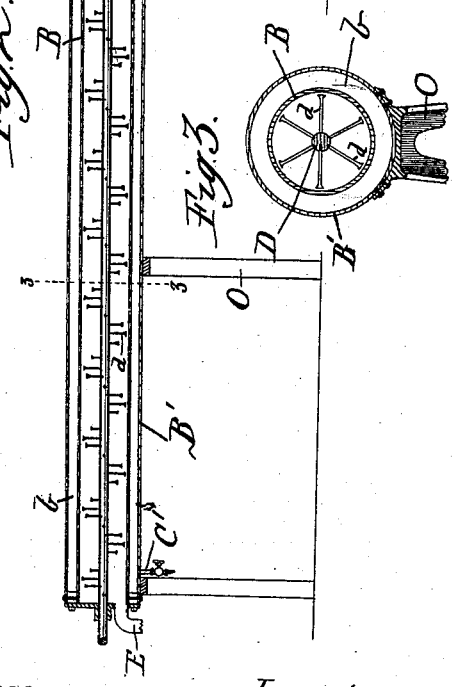
Witnesses:
J. Everett Brown
H. M. Munday
Inventor:
Charles H. Robison,
per
Munday Evarts & Adcock
his Attorneys

UNITED STATES PATENT OFFICE.

CHARLES H. ROBISON, OF CHICAGO, ILLINOIS.

APPARATUS FOR RENDERING FATS.

SPECIFICATION forming part of Letters Patent No. 287,862, dated November 6, 1883.

Application filed July 13, 1883. (No model.)

*To all whom it may concern:*

Be it known that I, CHARLES H. ROBISON, a citizen of the United States, residing in Chicago, in the county of Cook and State of Illinois, have invented a new and useful Improvement in Apparatus for Rendering Fats, of which the following is a specification.

My invention relates to apparatus for use in the rendering of the various kinds of animal fats, and to certain improvements in the processes employed in rendering such fats, and will be fully understood from the following description and the accompanying drawings, in which—

Figure 1 is a side elevation of the apparatus; Fig. 2, a vertical longitudinal section thereof, and Fig. 3 is an enlarged transverse section upon the line 3 3 of Fig. 2.

In said drawings, A represents a cutting-machine, whereby the tallow and other fatty matter is cut up into small pieces preparatory to melting. I do not illustrate this cutting-machine particularly, as any of the well-known forms thereof can be used. The fat, after being cut up by this machine, is passed through a spout, $a\ a'$, into a long close cylinder, B, resting upon any suitable supports, O O, in a position substantially horizontal. This cylinder is surrounded by a larger concentric cylinder, B', a steam-space, $b$, being formed between the two. The pipe C supplies this space with the steam necessary for the melting of the fat, and the water of condensation is drawn off therefrom, when necessary, by the outlet-pipe C'. By means of this steam-space the entire cylinder B may be heated to any degree required for the melting of the material operated upon, and the heating may of course be graduated or regulated as, judgment may dictate. Extending entirely through the inner cylinder is a rotating shaft, D, provided with bearings at each end of the cylinder, and this shaft is armed with projecting spikes or points $d$, arranged in spiral line or lines around the same, so that they serve, when the shaft is rotated, not only to stir and agitate the fatty matter, but also to convey or force the same through the cylinder. When the fat substances first enter the cylinder, I prefer that they should come under the influence of a positive-feed device for a short distance, in order that they may not lodge and choke up the initial end of the cylinder, and for this purpose the shaft D is provided with a spiral conveyer, $d'$, at the receiving end, such spiral conveyer being continuous, after the fashion of the conveyers used in flour and other mills, and extending only a short distance along the shaft. The material is not allowed to lodge at any point in its course through the cylinder, and is melted by the time it reaches the outlet end, where it is drawn off through the pipe E into the tank F, where it is strained through screens $f$, of graduated fineness. The refuse of the fat, commonly called "scrap," of course passes out with the melted mass and is caught upon the screens. The shaft is rotated by power applied to the pulley H.

The apparatus permits the carrying on of the rendering continuously, and possesses great advantage over the method of rendering by the use of kettles usually employed. It avoids overheating or burning of the material, works very rapidly in point of time, insures the continual change of position of every particle or piece of fat, saves the labor of dipping up the fat from the kettle, saves the time and labor employed in filling and emptying the kettles, and the settlings cannot accumulate therein as they do in kettles, so that the apparatus is automatically kept clean.

The shaft may be rotated at any speed desired, and it may be found beneficial to vary the movement with different kinds of matter.

The apparatus permits the use of water as a heating medium equally as well as steam without change, except in connecting the feed-pipe to the boiler, where it will draw water instead of steam. The cylinder is preferably inclined slightly from one end to the other, to insure the flow of the melted fat.

Among other advantages my apparatus and process have over the old methods of rendering are these: The material rendered is passed through in a constant stream or procession, presenting only a small quantity to be acted upon by the heat at a time at any one point, thus permitting the heat to work quickly, whereas in the old method a large mass is operated upon at once, which causes the portions exposed to the greatest heat to become injured through the long continuance thereof rendered necessary to melt the more remote portions; secondly, every part of the fat stays in the cylinder the same length of time and is equally acted upon, which manifestly is not true of the kettle rendering; thirdly, the fat runs off to the exit as fast as it liquefies and escapes before it can become deteriorated.

I claim—

1. The improvement in the art of rendering, consisting in moving the fats continuously through a horizontal passage or chamber, which is heated externally, and in which the fats are melted as they pass from one end to the other, substantially as specified.

2. The improvement in the art of rendering, consisting in passing the fats continuously through a horizontal externally-heated passage or chamber, and subjecting them to continuous agitation while passing through such passage or chamber, substantially as specified.

3. The improvement in the art of rendering fats, consisting, first, in cutting up the material; second, in passing it in a stream through a heated chamber or passage, wherein it is subjected to continuous agitation; and, third, in straining the melted resultant, substantially as specified.

4. In apparatus for rendering lard, the horizontal chamber or passage surrounded by a steam or water jacket, conveying and agitating devices for moving the fats through said chamber or passage and agitating them as they go, and devices for actuating said conveying-agitators, substantially as specified.

5. The apparatus for rendering fats, consisting of a horizontal externally-heated passage or chamber provided with conveying devices, a cutting-machine at the initial end, and a straining-tank for the melted fat at the discharge end of said passage or chamber, all operating substantially as specified.

6. In apparatus for rendering fats, the horizontal externally-heated cylinder, in combination with the shaft rotating in said cylinder, and provided with spikes or pins arranged spirally around the shaft, substantially as specified.

7. In apparatus for rendering fats, the cylinder arranged horizontally, the shaft provided with spiral agitating-conveyers, and means for heating said cylinder externally, all combined and operating substantially as specified.

8. The combination, with the horizontal heating-cylinder, of a positive feed device at the initial end, and agitating-points for the remainder of its length, substantially as specified.

C. H. ROBISON.

Witnesses:
HENRY F. AKIN,
H. M. MUNDAY.